US009448741B2

(12) United States Patent
Deshpande et al.

(10) Patent No.: US 9,448,741 B2
(45) Date of Patent: Sep. 20, 2016

(54) PIGGY-BACK SNOOPS FOR NON-COHERENT MEMORY TRANSACTIONS WITHIN DISTRIBUTED PROCESSING SYSTEMS

(71) Applicants: Sanjay R. Deshpande, Austin, TX (US); John E. Larson, Round Rock, TX (US); Fernando A. Morales, Austin, TX (US); Thang Q. Nguyen, Austin, TX (US); Mark A. Banse, Austin, TX (US)

(72) Inventors: Sanjay R. Deshpande, Austin, TX (US); John E. Larson, Round Rock, TX (US); Fernando A. Morales, Austin, TX (US); Thang Q. Nguyen, Austin, TX (US); Mark A. Banse, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 178 days.

(21) Appl. No.: 14/495,209

(22) Filed: Sep. 24, 2014

(65) Prior Publication Data
US 2016/0085478 A1 Mar. 24, 2016

(51) Int. Cl.
*G06F 3/06* (2006.01)
*G06F 12/08* (2016.01)

(52) U.S. Cl.
CPC ........... *G06F 3/0653* (2013.01); *G06F 3/0604* (2013.01); *G06F 3/0683* (2013.01); *G06F 12/0835* (2013.01)

(58) Field of Classification Search
CPC ........... G06F 12/0831; G06F 12/0835; G06F 12/0813; G06F 12/0811; G06F 12/0822
See application file for complete search history.

(56) References Cited

U.S. PATENT DOCUMENTS

| | | | | |
|---|---|---|---|---|
| 5,900,017 A | * | 5/1999 | Genduso | G06F 12/0835 711/119 |
| 7,263,586 B1 | * | 8/2007 | Kapil | G06F 12/0831 711/141 |
| 8,090,913 B2 | | 1/2012 | Pelley et al. | |
| 8,473,644 B2 | | 6/2013 | Deshpande et al. | |
| 8,554,967 B2 | | 10/2013 | Deshpande | |
| 2002/0129211 A1 | * | 9/2002 | Arimilli | G06F 12/0831 711/146 |
| 2007/0079074 A1 | * | 4/2007 | Collier | G06F 12/082 711/141 |
| 2008/0109609 A1 | * | 5/2008 | Shen | G06F 12/0831 711/146 |
| 2009/0112563 A1 | * | 4/2009 | Drerup | G06F 17/5022 703/21 |
| 2013/0024629 A1 | * | 1/2013 | Flanders | G06F 12/0831 711/146 |
| 2014/0115272 A1 | * | 4/2014 | Pierson | H04L 63/0263 711/146 |

* cited by examiner

*Primary Examiner* — Ryan Bertram

(57) ABSTRACT

Piggy-back snoops are used for non-coherent memory transactions in distributed processing systems. Coherent and non-coherent memory transactions are received from a plurality of processing cores within a distributed processing system. Non-coherent snoop information for the non-coherent memory transactions is combined with coherent snoop information for the coherent memory transactions to form expanded snoop messages. The expanded snoop messages are then output to a snoop bus interconnect during snoop cycles for the distributed processing system. As such, when the processing cores monitor the snoop bus interconnect, the processing cores receive the non-coherent snoop information along with coherent snoop information within the same snoop cycle. While this piggy-backing of non-coherent snoop information with coherent snoop information uses an expanded snoop bus interconnect, usage of the coherent snoop bandwidth is significantly reduced thereby improving overall performance of the distributed processing system.

20 Claims, 5 Drawing Sheets

US 9,448,741 B2

PIGGY-BACK SNOOPS FOR NON-COHERENT MEMORY TRANSACTIONS WITHIN DISTRIBUTED PROCESSING SYSTEMS

TECHNICAL FIELD

This technical field relates to snoop bus interconnects for memory transactions in distributed processing systems having shared memory resources.

BACKGROUND

Certain distributed processing systems use snoop bus interconnects to allow processing cores within the distributed processing systems to determine the status of transactions to shared memory resources. In particular, a memory controller places information on the snoop bus interconnect indicating in part which processing core currently has an active memory transaction being performed along with information about the memory transaction. The processing cores can then monitor the snoop bus interconnect to determine when relevant memory transactions are being performed with respect to the shared memory resources.

During operation of such a distributed processing system, the bandwidth for the snoop bus interconnect is a highly utilized resource that can limit performance. Although certain non-coherent memory transactions for processing cores, such as write-back or cast-out transactions for caches within the processing cores, are not relevant to other processing cores, snoop information for these non-coherent memory transactions is still output to the snoop bus interconnect because the associated data could be shared coherently by other caches in the distributed processing system. These non-coherent transactions are ordered within the global order of performance of all coherent transactions to the same data locations within the shared memory resources. As such, snoop information for these non-coherent transactions is placed on the snoop bus interconnect along with snoop information for coherent transactions by inserting the non-coherent snoop information within the sequence of coherent snoop information. Although the non-coherent snoop information is relevant only to the requester processing core for that non-coherent memory transaction and to the storage device it targets, this non-coherent snoop information still occupies a slot within the snoop bandwidth for all devices.

FIG. 1 (Prior Art) is a block diagram of an example embodiment 100 for a distributed processing system having multiple processing cores 104, a memory bus interconnect 102, a snoop bus interconnect 106, and a memory controller 108. The processing cores 104 are coupled to the memory bus interconnect 102 and to the snoop bus interconnect 106. A memory controller 108 is also coupled to the memory bus interconnect 102 and one or more shared memory devices 114. Memory transactions from the processing cores 104 are communicated through the memory bus interconnect 102 to the memory controller 108. The memory controller 108 includes a memory transaction controller 110 that controls the release of ordered memory transactions 118 from the processing cores 104 to the shared memory devices 114 through the memory device bus 116. The memory controller 108 also includes a snoop bus controller 112 that provides snoop messages 120 to the snoop bus interconnect 106. These snoop messages 120 include snoop information 122 and are ordered to correspond to the ordered memory transactions 118 being released on the memory device bus 116.

The ordered memory transactions 118 represent memory transactions directed to common data locations within the memory devices 114, and these ordered memory transactions 118 are released in order to the memory device bus 116. These ordered memory transactions 118 include coherent memory transactions (e.g., CMT1, CMT2, CMT3, ... ) and non-coherent memory transactions (e.g., NCMT1, NCMT2, ... ). The coherent memory transactions (e.g., CMT1, CMT2, CMT3, ... ) relate to memory transactions issued by a requester processing core that are potentially relevant to multiple processing cores, and non-coherent memory transactions (e.g., NCMT1, NCMT2, ... ) relate to memory transactions issued by a requester processing core that are only relevant to that requesting processing core. The snoop information 122 is associated with the ordered memory transactions 118 and is similarly ordered. As such, this snoop information 122 includes snoop information corresponding to the coherent memory transactions (e.g., SN-CMT1, SN-CMT2, SN-CMT3, ... ) and snoop information corresponding to the non-coherent memory transactions (e.g., SN-NCMT1, SN-NCMT2, ... ). This snoop information 122 for each memory transaction is released as a snoop message 120 to the snoop bus interconnect 106 during snoop cycles for the distributed processing system 100. It is noted that the snoop message 120 can be an N-bit snoop message and that the snoop bus interconnect 106 can be implemented using N physical wires, where N is a selected integer number.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Piggy-back snoop systems and methods are disclosed for non-coherent memory transactions in distributed processing systems. For the disclosed embodiments, coherent and non-coherent memory transactions are received from a plurality of processing cores within a distributed processing system. Non-coherent snoop information for the non-coherent memory transactions is combined with coherent snoop information for the coherent memory transactions to form expanded snoop messages. The expanded snoop messages are then output to a snoop bus interconnect during snoop cycles for the distributed processing system. As such, when the processing cores monitor the snoop bus interconnect, the processing cores receive the non-coherent snoop information along with coherent snoop information within the same snoop cycle. While this piggy-backing of non-coherent snoop information with coherent snoop information uses an expanded snoop bus interconnect, usage of the coherent snoop bandwidth is significantly reduced thereby improving overall performance of the distributed processing system. Different features and variations can be implemented, as desired, and related or modified systems and methods can be utilized, as well.

As described herein, the disclosed embodiments combine non-coherent snoop information for non-coherent memory transactions with coherent snoop information for coherent memory transactions using an expanded snoop bus interconnect to conserve coherent snoop bandwidth within a distributed processing system. For certain embodiments, the non-coherent snoop information for non-coherent memory transactions is combined with or is piggy-backed onto coherent snoop information for coherent memory transactions using a small number of additional side-band wires added to normal snoop bus wires thereby conserving the bandwidth of the coherent snoop bus interconnect path. The non-coherent snoop information for the piggy-back snoop (PBS) can include a number of fields, such as a PBS valid field, a requester identifier (RID) field, a transaction identifier (TID) field, and/or other fields, as described further below. The non-coherent transactions related to the piggy-back snoop information can be ordered consistently to occur before or after coherent snoop transactions. Further, processing cores monitoring the snoop bus interconnect can respond to both the coherent snoop information and the non-coherent snoop information being received within the same snoop cycle on the expanded snoop bus interconnect. While this piggy-back snoop approach expands the snoop bus interconnect, this piggy-back snoop approach significantly reduces bandwidth usage of the coherent snoop bus interconnect path and can save up to fifty percent or more of the coherent snoop bandwidth under certain conditions thereby effectively doubling the available coherent snoop bandwidth in the distributed processing system.

Figure 2:
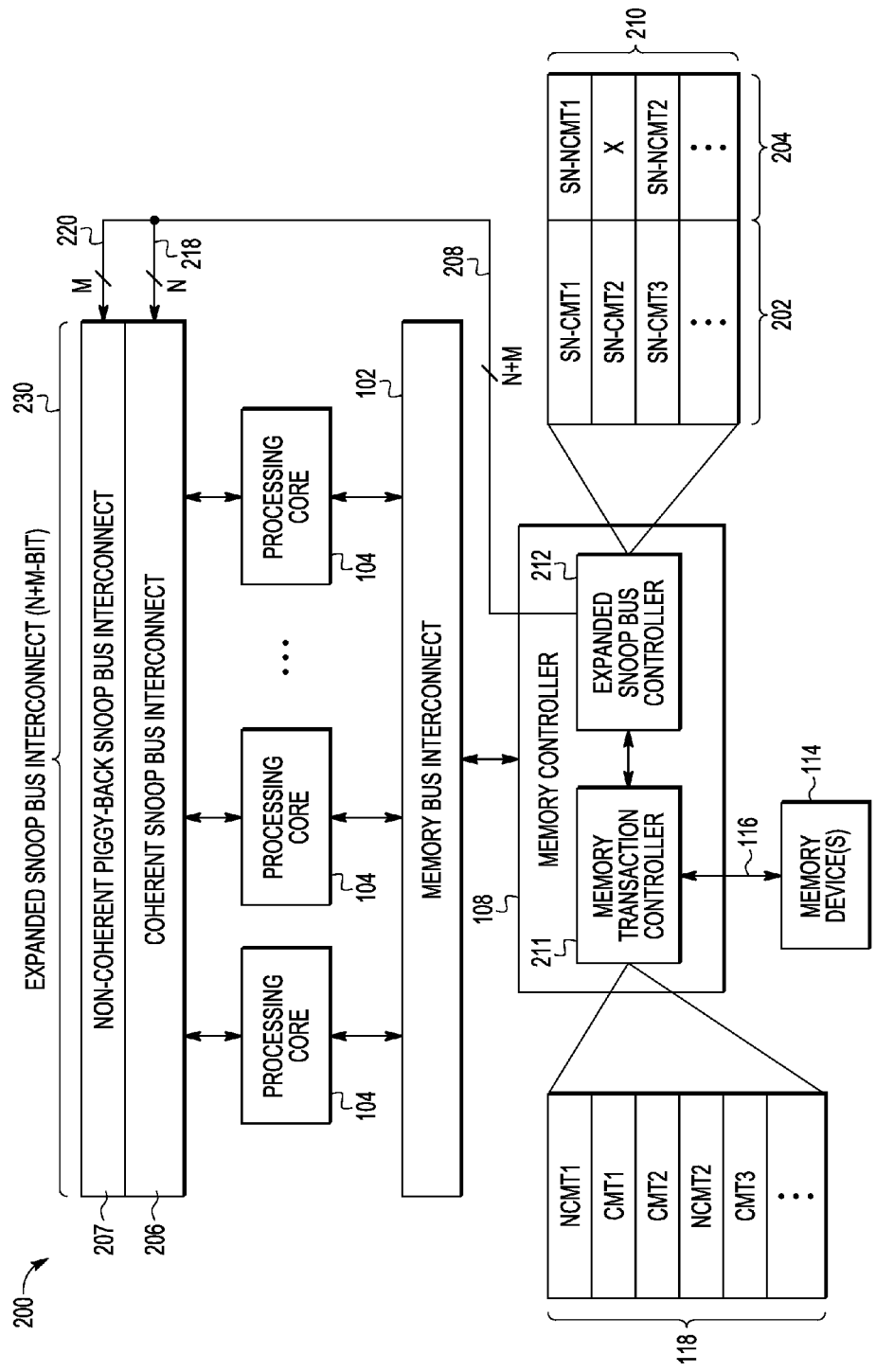
FIG. 2 is a block diagram of an example embodiment for a distributed processing system having an expanded snoop bus interconnect for that includes a non-coherent snoop bus interconnect combined with or piggy-backed onto a coherent snoop bus interconnect.

FIG. 2 is a block diagram of an example embodiment 200 for a distributed processing system having an expanded snoop bus interconnect 230 that includes a coherent snoop bus interconnect 206 combined with a non-coherent piggy-back snoop bus interconnect 207. Multiple processing cores 104 are coupled to the memory bus interconnect 102 and the expanded snoop bus interconnect 230. Memory transactions from the processing cores 104 are communicated through the memory bus interconnect 102 to the memory controller 108. The memory controller 108 includes a memory transaction controller 211 that controls the order in which the memory transactions from the processing cores 104 are released on the memory device bus 116 to one or more shared memory devices 114. The memory controller 108 also includes an expanded snoop bus controller 212 that provides expanded snoop messages 208 to the expanded snoop bus interconnect 230. These expanded snoop messages 208 include coherent snoop information 202 for coherent memory transactions and non-coherent snoop information 204 for non-coherent memory transactions.

The coherent snoop information 202 and the non-coherent snoop information 204 can be, for example, acknowledgement messages indicating that the respective memory transactions were completed by the one or more shared memory devices 114. For example, the one or more memory devices 114 can output memory transaction completion acknowledgement information on the memory device bus 116 to the memory controller 108. The memory controller 108 can then include acknowledgement messages and/or other desired information as part of the coherent snoop information 202 and/or the non-coherent snoop information 204. By monitoring the snoop bus interconnect 106, therefore, the plurality of processing cores 104 can determine when their respective coherent and non-coherent memory transactions have been completed by the one or more shared memory devices 114. It is further noted that the coherent snoop information 202 and the non-coherent snoop information 204 can include other information related to memory transactions from the processing cores 104.

As above, the ordered memory transactions 118 represent memory transactions directed to common locations that are being released in order on the memory device bus 116. For the embodiment depicted, the first memory transaction is placed at the top of the ordered memory transactions 118. Also as indicated above, these memory transactions include coherent memory transactions (e.g., CMT1, CMT2, CMT3, . . . ) that are potentially relevant to a plurality of the processing cores 104 including a requester processor core and non-coherent memory transactions (e.g., NCMT1, NCMT2, . . . ) that are relevant only to the requester processing core that issued the non-coherent memory transaction. It is noted that coherent memory transactions (e.g., CMT1, CMT2, CMT3, . . . ) are memory transactions by one processing core that could affect the operations of one of the other processing cores, such as memory write transactions where data will be written to one or more shared memory locations within the memory devices 114. In contrast, non-coherent memory transactions (e.g., NCMT1, NCMT2, . . . ) are memory transactions by one processing core that will not affect the operations of one of the other processing cores, such as a write-back transaction associated with a cache within that processing core.

Figure 1:
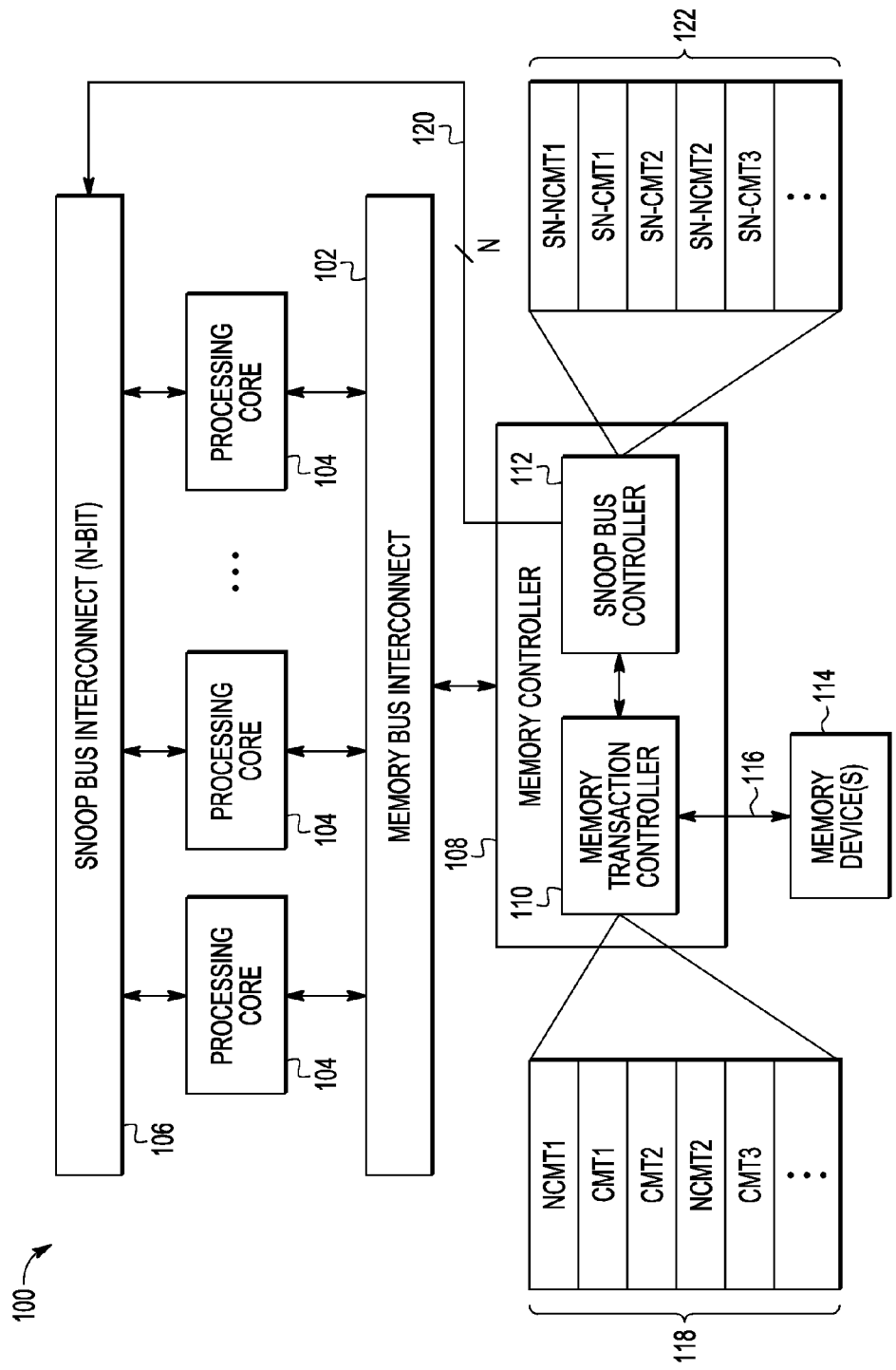
FIG. 1 (Prior Art) is a block diagram of an example embodiment for a distributed processing system having a snoop bus interconnect for coherent snoop messages and non-coherent snoop messages.

In contrast to embodiment 100 of FIG. 1 (Prior Art), expanded snoop information 210 includes coherent snoop information 202 for coherent memory transactions combined with non-coherent snoop information 204 for non-coherent memory transactions. As depicted, the non-coherent snoop information 204 (e.g., SN-NCMT1, SN-NCMT2, . . . ) for the non-coherent memory transactions is added to coherent snoop information 202 (e.g., SN-CMT1, SN-CMT2, SN-CMT3, . . . ) for the coherent memory transactions. This expanded snoop information 210 is ordered with respect to the ordered memory transactions 118 being released to the memory device bus 116, and the expanded snoop information 210 is released as expanded snoop messages 208 to the expanded snoop bus interconnect 230. A first portion 218 of the expanded snoop message 208 corresponds to the coherent snoop information 202 and is provided to the coherent snoop bus interconnect 206 portion of the expanded snoop bus interconnect 230, and a second portion 220 of the expanded snoop message 208 corresponds to the non-coherent snoop information 204 and is provided to the non-coherent snoop bus interconnect 207 portion of the expanded snoop bus interconnect 230.

For one embodiment, the first portion 218 for the coherent snoop information is N-bit data, and the second portion 220 for the non-coherent snoop information is M-bit data. As described further below, N-bit coherent snoop information can be communicated, for example, using N physical wire interconnects, where N is a selected integer number of wires. Similarly, the M-bit non-coherent snoop information can be communicated, for example, using M physical wire interconnects, where M is a selected integer number of wires. In one embodiment, N can be 150, and M can be 32, although other numbers of wires could also be selected and used. It is further noted that other interconnect techniques can also be used to communicate the expanded snoop information 210.

Looking to the ordered memory transactions 118, it is noted that the non-coherent memory transactions are ordered with the coherent memory transactions for release to the memory device bus 116. For the embodiment depicted, the order for the memory transactions that will be released is a first non-coherent memory transaction (NCMT1), a first coherent memory transaction (CMT1), a second coherent memory transaction (CMT2), a second non-coherent memory transaction (NCMT2), and a third coherent memory transaction (CMT3). Additional memory transactions would follow.

Looking to the expanded snoop information 210, it is noted that each row represents information included within a single expanded snoop message 208 that will be released during a snoop cycle by the expanded snoop bus controller 212 to the expanded snoop bus interconnect 230. For the example embodiment depicted, a first snoop information message includes first non-coherent snoop information (SN-NCMT1) for a first non-coherent memory transaction (NCMT1) that has been added to or piggy-backed with first coherent snoop information (SN-CMT1) for a first coherent memory transaction (CMT1). A second snoop information message includes second coherent snoop information (SN-CMT2) for a second coherent memory transaction (CMT2). The "X" within the portion of the expanded snoop message 208 for non-coherent snoop information 204 represents a cycle where no non-coherent snoop information is being communicated. A third snoop information message includes second non-coherent snoop information (SN-NCMT2) for a second non-coherent memory transaction (NCMT2) that has been added to or piggy-backed with third coherent snoop information (SN-CMT3) for a third coherent memory transaction (CMT3). Additional snoop information messages would further be formed by combining non-coherent snoop information for additional non-coherent memory transactions, if available, with coherent snoop information for additional coherent memory transactions.

It is further noted that non-coherent snoop information is added to coherent snoop information such that it is assumed that the corresponding non-coherent memory transaction has occurred before the corresponding coherent memory transaction. Looking back to the expanded snoop information 210, it is seen that the first non-coherent snoop information (SN-NCMT1) has been combined with the first coherent snoop information (SN-CMT1) as the corresponding first non-coherent memory transaction (NCMT1) occurred before the first coherent memory transaction (CMT1). Similarly, the second non-coherent snoop information (SN-NCMT2) has been combined with the third coherent snoop information (SN-CMTS) as the corresponding second non-coherent memory transaction (NCMT2) occurred before the corresponding third coherent memory transaction (CMTS). The second non-coherent snoop information (SN-NCMT2) was not combined with the second coherent snoop information (SN-CMT2) as the corresponding second coherent memory transaction (CMT2) occurred before the corresponding second non-coherent memory transaction (NCMT2). For alternative embodiments, it is noted that the non-coherent snoop information could instead be combined with coherent snoop information such that corresponding non-coherent memory transactions are assumed to occur after the corresponding coherent memory transactions. This alternative, for example, would lead to the second non-coherent snoop information (SN-NCMT2) being combined with the second coherent snoop information (SN-CMT2). Other variations could also be implemented.

Figure 3:
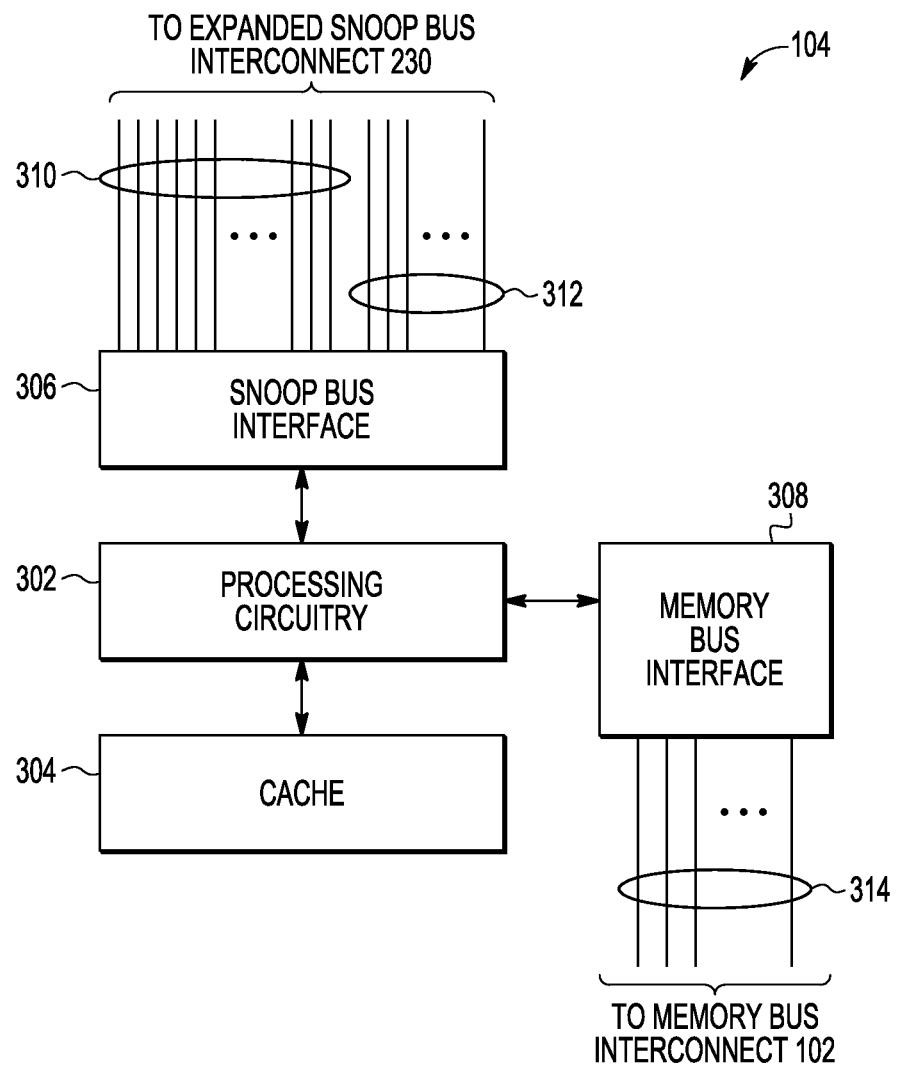
FIG. 3 is a block diagram of an example embodiment for a processing core including an expanded snoop bus interface.

FIG. 3 is a block diagram of an example embodiment for a processing core 104. Processing circuitry 302 performs the processing functions of the processing core 104 and is coupled to cache 304, an expanded snoop bus interface 306, and a memory bus interface 308. During operation, the processing circuitry 302 issues memory transactions between memory locations within the local cache 304, which provides local data storage for the processing circuitry 302, and memory locations within the shared memory devices 114. The processing circuitry 302 provides these memory transactions to the memory bus interface 308, and the memory bus interface 308 then outputs memory transaction messages to connection 314. Connection 314 can be implemented, for example, using a plurality of physical wires that carry digital data and that are connected to the memory bus interconnect 102. As described above, these memory transaction messages are provided to the memory controller 108 through the memory bus interconnect 102. As also described above, the memory controller 108 places expanded snoop messages 208 on the expanded snoop bus interconnect 230 that include expanded snoop information 210 including coherent snoop information 202 and non-coherent snoop information 204.

The processing circuitry 302 monitors the expanded snoop bus interconnect 230 using the expanded snoop bus interface 306. The expanded snoop bus interface 306 receives the expanded snoop messages 208 from the expanded snoop bus interconnect 230 using connections 310 and connections 312. Connections 310 can be implemented, for example, using a plurality of physical wires that carry digital data (e.g., N physical wires carrying N-bit data) and that are connected to coherent snoop bus interconnect 206 portion of the expanded snoop bus interconnect 230. Connections 312 can be implemented, for example, using a plurality of physical wires that carry digital data (e.g., M physical wires carrying M-bit data) and that are connected to non-coherent snoop bus interconnect 207 portion of the expanded snoop bus interconnect 230. Thus, when the processing circuitry 302 monitors the expanded snoop bus interconnect 230, the processing circuitry 302 receives both coherent snoop information 202 and non-coherent snoop information 204 within the expanded snoop messages 208 placed on the expanded snoop bus interconnect 230 by the memory controller 108.

Figure 4:
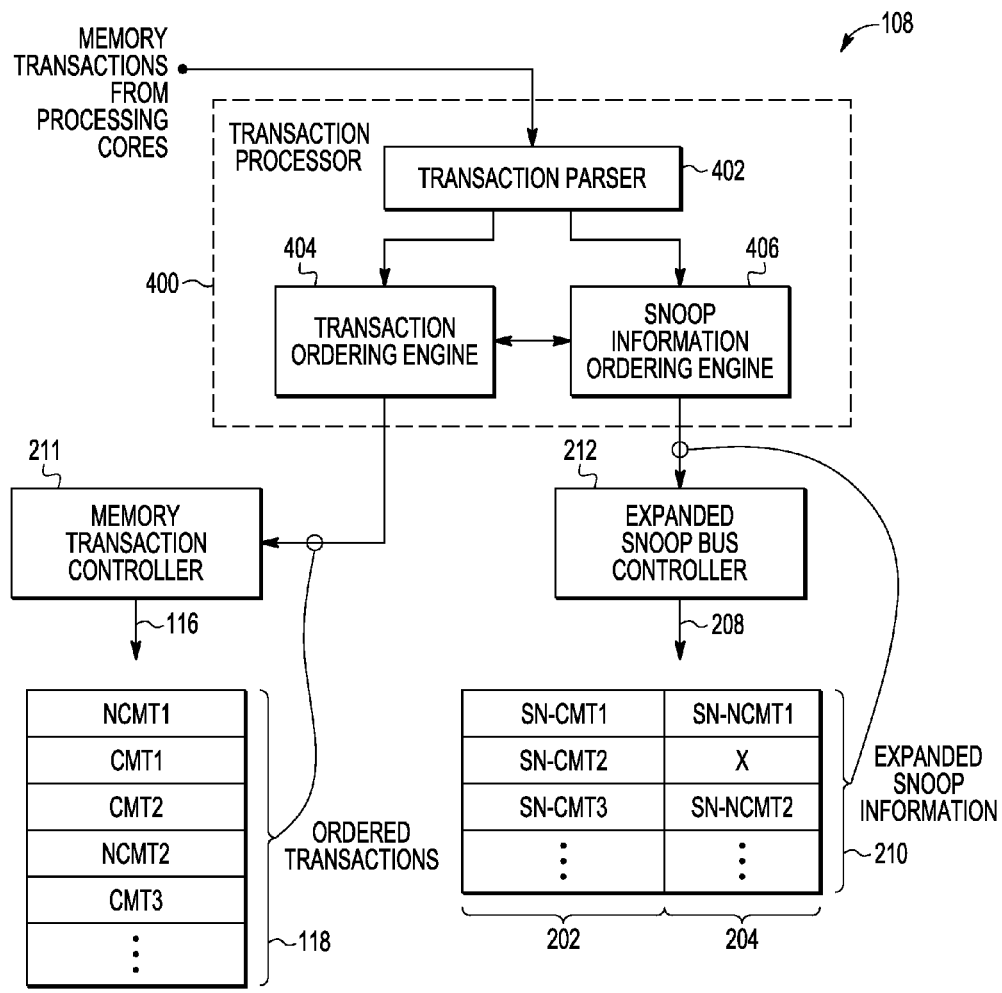
FIG. 4 is a block diagram of an example embodiment for a memory controller including a memory transaction controller, an expanded snoop bus controller, and a transaction processor.

FIG. 4 is a block diagram of an example embodiment for memory controller 108 including a memory transaction controller 211, an expanded snoop bus controller 212, and a transaction processor 400. The transaction processor 400 includes transaction parser 402, transaction ordering engine 404, and snoop information ordering engine 406. During operation, the transaction parser 402 receives memory transactions from the processing cores 104 and determines whether each transaction is a coherent memory transaction (CMT) or a non-coherent memory transaction (NCMT) and also determines transaction related information from the memory transactions such as requester ID (RID), transaction ID (TID), memory access location, and/or other information related to the memory transaction. Transaction related information is then sent from the transaction parser 402 to the transaction ordering engine 404 and to the snoop information ordering engine 406. The transaction ordering engine 404 analyzes the transaction information, orders the transactions, and provides ordered memory transactions 118 to the memory transaction controller 211. The memory transaction controller 211 in turn outputs these ordered memory transaction 118 as transaction messages on the memory device bus 116 during a plurality of transaction cycles. The snoop information ordering engine 406 analyzes transaction information, combines non-coherent snoop information 204 with coherent snoop information 202, orders the snoop information, and provides ordered snoop information 210 to the expanded snoop bus controller 212. The expanded snoop bus controller 212 in turn outputs this ordered snoop information 210 as expanded snoop messages 208 to the expanded snoop bus interconnect 230 on a plurality of snoop cycles.

Figure 5:
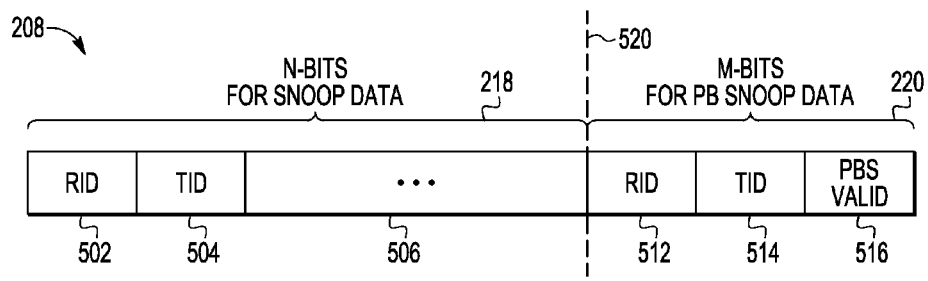
FIG. 5 is a diagram of an example embodiment for an expanded snoop message.

FIG. 5 is a diagram of an example embodiment for an expanded snoop message 208. For the embodiment depicted, the expanded snoop message 208 includes N-bit portion 218 for coherent snoop data associated with the coherent snoop information 202 and M-bit portion 220 for non-coherent piggy-back (PB) snoop data associated with non-coherent snoop information 204. The snoop data portion 218 can include one or more fields that hold data associated with a coherent memory transaction, such as a requester identifier (RID) field 502, a transaction identifier (TID) field 504, and/or additional fields 506. For example, one or more of the additional fields 506 within the snoop data portion 218 can identify a memory location being accessed by the coherent memory transaction. The non-coherent piggy-back (PB) snoop data portion 220 can include one or more fields that hold data associated with the non-coherent memory transaction. As the PB snoop data 220 is only relevant to the requester processing core that issued the non-coherent memory transaction and the requester processing core is already aware of the details of the transaction, fewer data fields can be used within the PB snoop data portion 220. For the embodiment depicted, the PB snoop data portion 220 includes a requester identifier (RID) field 512, a transaction identifier (TID) field 514, and a PBS (piggy-back snoop) valid field 516. It is noted that for one embodiment the PBS valid field 516 is a one-bit field, and this one-bit PBS valid field 516 is asserted (e.g., set to logic 1) if non-coherent snoop information will be included within the expanded snoop message 208 for a given snoop cycle and is de-asserted (e.g., set to logic 0) if non-coherent snoop information will not be included within the expanded snoop message 208 for a given snoop cycle. It is further noted that additional fields could be used within the PB snoop data portion 220 if desired. Other variations could also be implemented.

During operation of the distributed processing system 200, the number of coherent memory transactions and the number of non-coherent memory transactions being received within a given period of time will change. It is typically expected, however, that the number of coherent memory transactions will outnumber the number of non-coherent memory transactions being received. As such, non-coherent snoop information for a non-coherent memory transaction can typically be added to coherent snoop information for a coherent memory transaction. As indicated above, if there is no outstanding non-coherent snoop information to be sent for a given snoop cycle, the PBS valid field can be de-asserted to indicate that there is no valid piggy-back (PB) snoop data for that snoop cycle. Although unlikely to occur, if there is outstanding non-coherent snoop information to be sent out for a snoop cycle and there is no outstanding coherent snoop information to be sent out for that snoop cycle, the non-coherent snoop information can be sent out as if it were coherent snoop information on the coherent snoop bus interconnect 206. As the requester processing core 104 will already be monitoring the expanded snoop bus interconnect 230 due to its pending non-coherent memory transaction, the requester ID and the transaction ID for the non-coherent snoop information will still be detected even if it is placed within the RID and TID fields 502/504 within the coherent snoop data portion 218. Other variations could also be implemented to address different numbers of coherent and non-coherent memory transactions being received.

Figure 6:
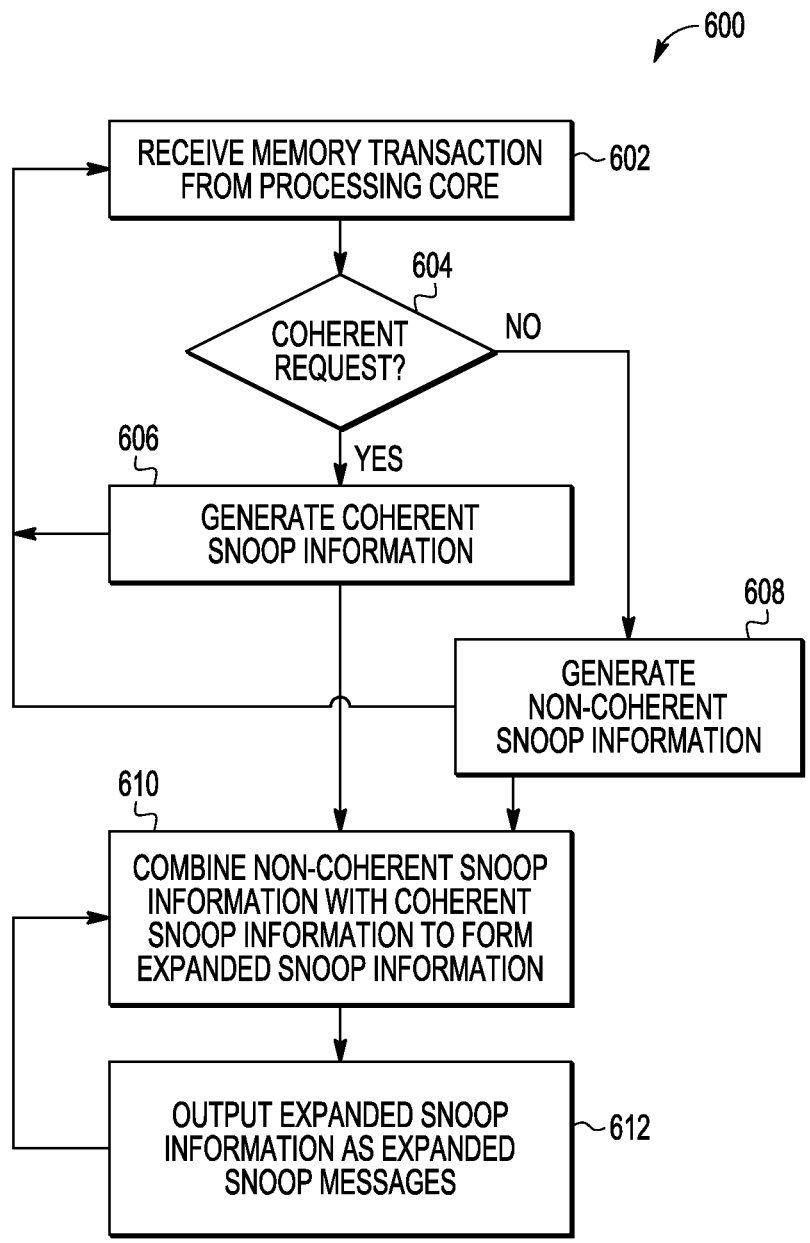
FIG. 6 is a process flow diagram of an embodiment for forming expanded snoop messages including coherent and non-coherent snoop information.

FIG. 6 is a process flow diagram of an embodiment 600 for forming expanded snoop messages including coherent and non-coherent snoop information. In block 602, a memory transaction is received from a processing core. In block 604, a determination is made whether the transaction request was a coherent transaction request. If "YES," then flow passes to block 606 where coherent snoop information is generated. If "NO," then flow passes to block 608 wherein non-coherent snoop information is generated. Steps 602, 604, 606 and 608 are repeated as a number of memory transactions are received. Further, in block 610, non-coherent snoop information for a non-coherent memory transaction is combined with coherent snoop information for a coherent memory transaction to form expanded snoop information. In block 612, expanded snoop information is output as expanded snoop messages to the expanded snoop interconnect, as described above. Steps 610 and 612 are repeated so that expanded snoop messages are output each snoop cycle for the distributed processing system 200.

As described herein, a variety of embodiments can be implemented and different features and variations can be implemented, as desired.

For one embodiment, a method is disclosed for operating a distributed processing system including receiving a plurality of memory transactions from a plurality of processing cores within a distributing processing system where the memory transactions include coherent memory transactions and non-coherent memory transactions, combining non-coherent snoop information for non-coherent memory transactions with coherent snoop information for coherent memory transactions to form a plurality of expanded snoop messages, and outputting the expanded snoop messages to a snoop bus interconnect during a plurality of snoop cycles for the distributed processing system.

In other embodiments, the method includes monitoring the snoop bus interconnect with the plurality of processing cores. In further embodiments, the method includes using a first portion of each expanded snoop message for data associated with the coherent snoop information and using a second portion of each expanded snoop message for data associated with the non-coherent snoop information. In still further embodiments, the method includes indicating within the second portion of the expanded snoop message whether valid non-coherent snoop information is included within the expanded snoop message. In addition, the second portion of the expanded snoop message can include a requester identifier field configured to identify a requester processing core, a transaction identifier field configured to identify a memory transaction, and a valid field configured to indicate whether valid non-coherent snoop information is included within the expanded snoop message.

In additional embodiments, the method includes ordering the memory transactions and outputting the ordered memory transactions to one or more memory devices. In further embodiments, the method includes combining non-coherent snoop information for each non-coherent memory transaction with coherent snoop information for a coherent memory transaction occurring after the non-coherent memory transaction within the ordered memory transactions. In other embodiments, the method includes combining non-coherent snoop information for each non-coherent memory transaction with coherent snoop information for a coherent memory transaction occurring before the non-coherent memory transaction within the ordered memory transactions. In still further embodiments, the snoop bus interconnect includes a plurality of wires including N wires for the coherent snoop information and M wires for the non-coherent snoop information.

For one other embodiment, a distributed processing system is disclosed including a snoop bus interconnect, a plurality of processing cores, a memory controller, and one or more memory devices coupled to the memory controller. The plurality of processing cores have memory transactions as outputs; the memory transactions include coherent memory transactions and non-coherent memory transactions; and the plurality of processing cores are coupled to the snoop bus interconnect to receive expanded snoop messages. The memory controller is coupled to receive the memory transactions from the plurality of processing cores and to output the expanded snoop messages to the snoop bus interconnect, and the expanded snoop messages include non-coherent snoop information for the non-coherent memory transactions combined with coherent snoop information for the coherent memory transactions.

In other embodiments, the distributed processing system includes a memory bus interconnect coupled between the plurality of processing cores and the memory controller. In further embodiments, a first portion of each expanded snoop message includes data associated with the coherent snoop information, and a second portion of each expanded snoop message includes data associated with the non-coherent snoop information. In still further embodiments, the second portion of the expanded snoop message includes a valid field to indicate whether valid non-coherent snoop information is included within the expanded snoop message. In addition, the second portion of the expanded snoop message can further include a requester identifier field configured to identify a requester processing core and a transaction identifier field configured to identify a memory transaction.

In additional embodiments, the one or more memory devices have transaction acknowledgement messages as outputs to the memory controller. Further, the coherent snoop information and the non-coherent snoop information can include transaction acknowledgement information.

In further embodiments, the memory transactions can be ordered. In still further embodiments, the expanded snoop messages include non-coherent snoop information for each non-coherent memory transaction combined with coherent snoop information for a coherent memory transaction occurring after the non-coherent memory transaction within the ordered memory transactions. In other embodiments, the expanded snoop messages include non-coherent snoop information for each non-coherent memory transaction combined with coherent snoop information for a coherent memory transaction occurring before the non-coherent memory transaction within the ordered memory transactions. In still further embodiments, the snoop bus interconnect includes a plurality of wires including N wires for the coherent snoop information and M wires for the non-coherent snoop information.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for operating a distributed processing system, comprising:
   receiving a plurality of memory transactions from a plurality of processing cores within a distributing processing system, the memory transactions comprising coherent memory transactions and non-coherent memory transactions;
   combining non-coherent snoop information for non-coherent memory transactions with coherent snoop information for coherent memory transactions to form a plurality of expanded snoop messages; and
   outputting the expanded snoop messages to a snoop bus interconnect during a plurality of snoop cycles for the distributed processing system.

2. The method of claim 1, further comprising monitoring the snoop bus interconnect with the plurality of processing cores.

3. The method of claim 1, further comprising using a first portion of each expanded snoop message for data associated with the coherent snoop information and using a second portion of each expanded snoop message for data associated with the non-coherent snoop information.

4. The method of claim 3, further comprising indicating within the second portion of the expanded snoop message whether valid non-coherent snoop information is included within the expanded snoop message.

5. The method of claim 4, wherein the second portion of the expanded snoop message comprises a requester identifier field configured to identify a requester processing core, a transaction identifier field configured to identify a memory transaction, and a valid field configured to indicate whether valid non-coherent snoop information is included within the expanded snoop message.

6. The method of claim 1, further comprising ordering the memory transactions and outputting the ordered memory transactions to one or more memory devices.

7. The method of claim 6, further comprising combining non-coherent snoop information for each non-coherent memory transaction with coherent snoop information for a coherent memory transaction occurring after the non-coherent memory transaction within the ordered memory transactions.

8. The method of claim 6, further comprising combining non-coherent snoop information for each non-coherent memory transaction with coherent snoop information for a coherent memory transaction occurring before the non-coherent memory transaction within the ordered memory transactions.

9. The method of claim 1, wherein the snoop bus interconnect comprises a plurality of wires including N wires for the coherent snoop information and M wires for the non-coherent snoop information.

10. A distributed processing system, comprising:
a snoop bus interconnect;
a plurality of processing cores having memory transactions as outputs, the memory transactions comprising coherent memory transactions and non-coherent memory transactions, and the plurality of processing cores being coupled to the snoop bus interconnect to receive expanded snoop messages;
a memory controller coupled to receive the memory transactions from the plurality of processing cores and to output the expanded snoop messages to the snoop bus interconnect, the expanded snoop messages comprising non-coherent snoop information for the non-coherent memory transactions combined with coherent snoop information for the coherent memory transactions; and
one or more memory devices coupled to the memory controller.

11. The distributed processing system of claim 10, further comprising a memory bus interconnect coupled between the plurality of processing cores and the memory controller.

12. The distributed processing system of claim 10, wherein a first portion of each expanded snoop message comprises data associated with the coherent snoop information and a second portion of each expanded snoop message comprises data associated with the non-coherent snoop information.

13. The distributed processing system of claim 12, wherein the second portion of the expanded snoop message comprises a valid field to indicate whether valid non-coherent snoop information is included within the expanded snoop message.

14. The distributed processing system of claim 13, wherein the second portion of the expanded snoop message further comprises a requester identifier field configured to identify a requester processing core and a transaction identifier field configured to identify a memory transaction.

15. The distributed processing system 10, wherein the one or more memory devices have transaction acknowledgement messages as outputs to the memory controller.

16. The distributed processing system of claim 15, wherein the coherent snoop information and the non-coherent snoop information comprises transaction acknowledgement information.

17. The distributed processing system of claim 10, wherein the memory transactions are ordered.

18. The distributed processing system of claim 17, wherein the expanded snoop messages comprise non-coherent snoop information for each non-coherent memory transaction combined with coherent snoop information for a coherent memory transaction occurring after the non-coherent memory transaction within the ordered memory transactions.

19. The distributed processing system of claim 17, wherein the expanded snoop messages comprise non-coherent snoop information for each non-coherent memory transaction combined with coherent snoop information for a coherent memory transaction occurring before the non-coherent memory transaction within the ordered memory transactions.

20. The distributed processing system of claim 10, wherein the snoop bus interconnect comprises a plurality of wires including N wires for the coherent snoop information and M wires for the non-coherent snoop information.

* * * * *